US 8,179,826 B2

(12) United States Patent
Robbins et al.

(10) Patent No.: US 8,179,826 B2
(45) Date of Patent: May 15, 2012

(54) SYSTEM AND APPARATUS FOR ADAPTING OPERATIONS OF A COMMUNICATION DEVICE

(75) Inventors: William S. Robbins, Sun Prairie, WI (US); Larry B. Pearson, San Antonio, TX (US); R. Tyler Wallis, Dallas, TX (US); Mark Ryan, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 762 days.

(21) Appl. No.: 12/329,511

(22) Filed: Dec. 5, 2008

(65) Prior Publication Data
US 2010/0144341 A1    Jun. 10, 2010

(51) Int. Cl.
- H04B 7/00 (2006.01)
- H04B 1/38 (2006.01)
- H04W 4/00 (2009.01)
- H04M 1/00 (2006.01)

(52) U.S. Cl. .......... 370/310.2; 370/315; 370/338; 455/552.1; 455/557

(58) Field of Classification Search .......... 370/310–350; 455/422.1, 426.1, 435.2, 436, 445, 456.3, 455/456.5, 552.1, 557
See application file for complete search history.

(56) References Cited

U.S. PATENT DOCUMENTS

| | | | |
|---|---|---|---|
| 2005/0064853 A1 | 3/2005 | Radpour | |
| 2008/0058017 A1 | 3/2008 | Carter et al. | |
| 2008/0096553 A1* | 4/2008 | Saksena et al. | 455/426.2 |
| 2008/0243999 A1* | 10/2008 | Pazhyannur et al. | 709/203 |
| 2009/0042563 A1* | 2/2009 | Bernard | 455/432.1 |
| 2009/0052395 A1* | 2/2009 | Bao et al. | 370/331 |
| 2009/0156213 A1* | 6/2009 | Spinelli et al. | 455/436 |
| 2009/0318193 A1* | 12/2009 | Littlefield et al. | 455/561 |
| 2010/0128709 A1* | 5/2010 | Liu et al. | 370/338 |
| 2010/0130170 A1* | 5/2010 | Liu et al. | 455/411 |
| 2011/0189987 A1* | 8/2011 | Zhang et al. | 455/422.1 |

OTHER PUBLICATIONS

Sprint, "Spring AIRAVE", 2 pages, http://www.nextel.com/en/services/airave/index.shtml, web site last visited Dec. 5, 2008.
Business Week, "Home is Where the Femtocell Is", The McGraw-Hill Companies, Jul. 20, 2007, 1 page, http://www.businessweek.com/technology/content/jul2007/tc20070730_802787.htm?cha..., web site last visited Nov. 28, 2008.

* cited by examiner

Primary Examiner — Tri H Phan
(74) Attorney, Agent, or Firm — Guntin Meles & Gust, PLC; Andrew Gust (57) ABSTRACT

A system that incorporates teachings of the present disclosure may include, for example, a base unit operable in part as a femtocell having a controller to detect a cellular phone, wirelessly establish communications with the cellular phone, establish communications with a cellular communication system by way of a broadband interface, and enable one or more landline phones communicatively couplable to the base unit to communicate with the cellular communication system responsive to establishing communications with the cellular phone. Other embodiments are disclosed.

25 Claims, 7 Drawing Sheets

SYSTEM AND APPARATUS FOR ADAPTING OPERATIONS OF A COMMUNICATION DEVICE

FIELD OF THE DISCLOSURE

The present disclosure relates generally to communication techniques and more specifically to a system and apparatus for adapting operations of a communication device.

BACKGROUND

In some instances cellular phones may not operate well in a building due to poor in-building penetration, or in-building interference. To improve cellular coverage, some service providers offer localized short-range base stations commonly known as femtocells to improve cellular communications inside a residence or business establishment. Femtocells provide cellular phones an alternative means to communicate with a cellular network by way of a broadband interface.

DETAILED DESCRIPTION

One embodiment of the present disclosure can entail a base unit operable in part as a femtocell having a controller to detect a cellular phone, wirelessly establish communications with the cellular phone, establish communications with a cellular communication system by way of a broadband interface, and enable one or more landline phones communicatively couplable to the base unit to communicate with the cellular communication system responsive to establishing communications with the cellular phone.

Another embodiment of the present disclosure can entail a computer-readable storage medium operable in part in a premises cellular access point having computer instructions to detect a cellular phone, establish communications with a cellular communication system by way of a broadband interface, and enable one or more landline phones to communicate with the cellular communication system responsive to detecting the cellular phone.

Yet another embodiment of the present disclosure can entail a cellular phone having a controller to establish communications with a cellular communication system by way of a device operating in part as a premises cellular base station. The device can be adapted to enable one or more landline phones to communicate with the cellular communication system responsive to the cellular phone being communicatively coupled to the device.

Another embodiment of the present disclosure can entail a landline phone having a controller to receive from a cellular communication system calls directed to a cellular phone responsive to the cellular phone establishing communications with a premises cellular base station.

Another embodiment of the present disclosure can entail a landline phone receiving from a cellular communication system calls directed to a cellular phone responsive to the cellular phone being communicatively coupled to a premises cellular base station.

Figure 1:
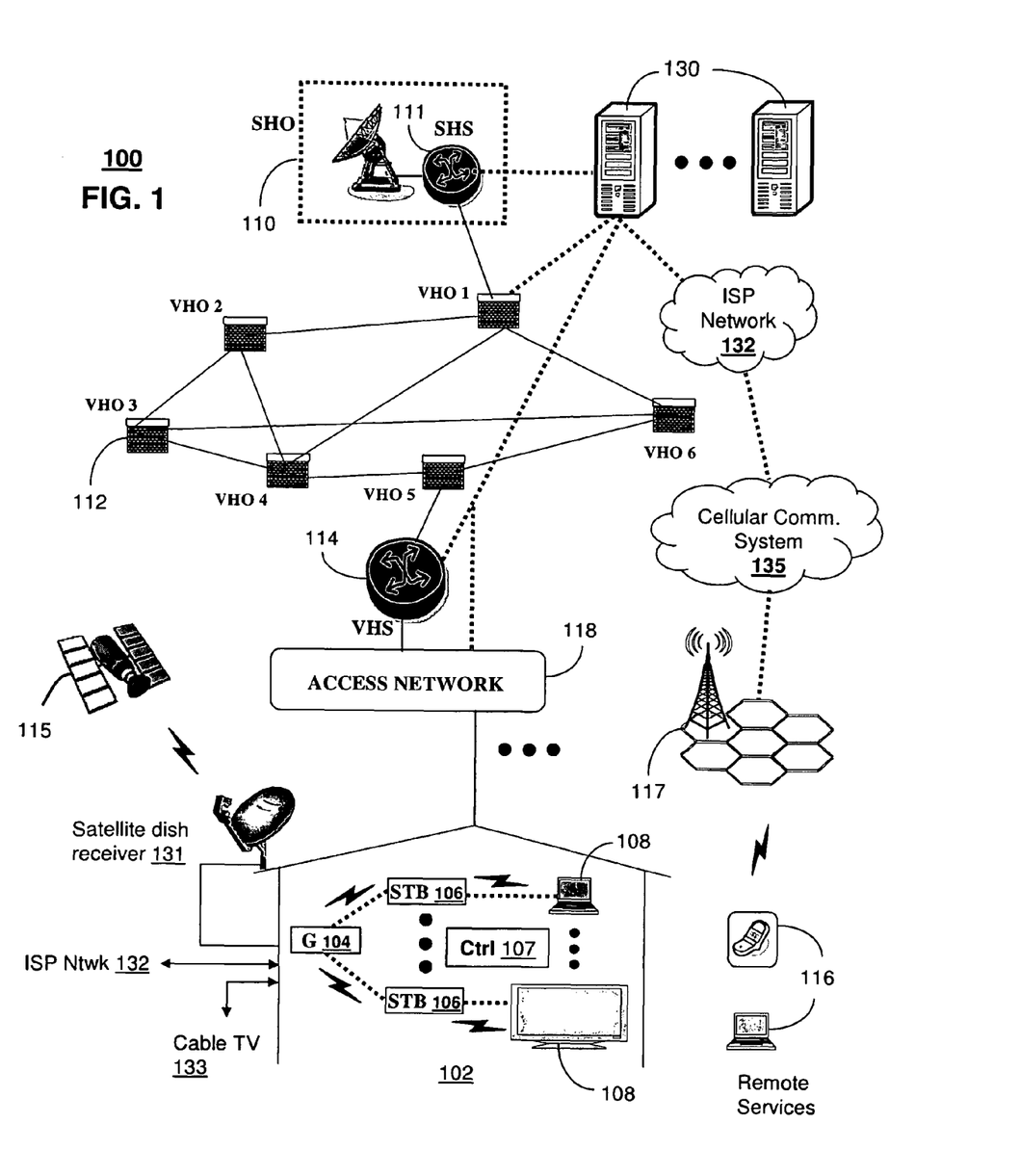
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

A cellular communication system 135 providing cellular communication services to roaming cellular phones can also be communicatively coupled to the ISP network 132 to provide communication services to cellular phones communicatively coupled to a premises base station such as a femtocell as will be described below by way of a method illustrated in FIG. 5.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
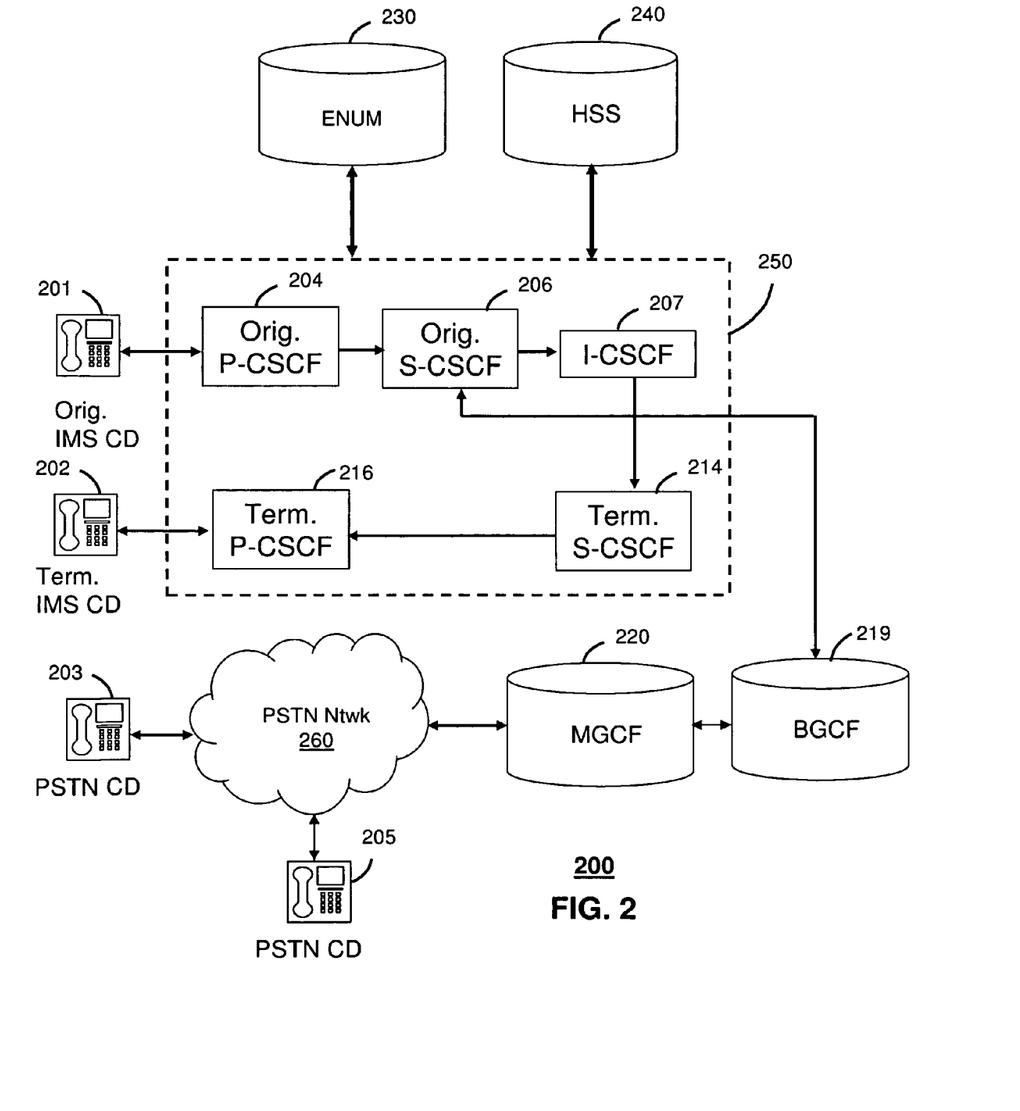

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
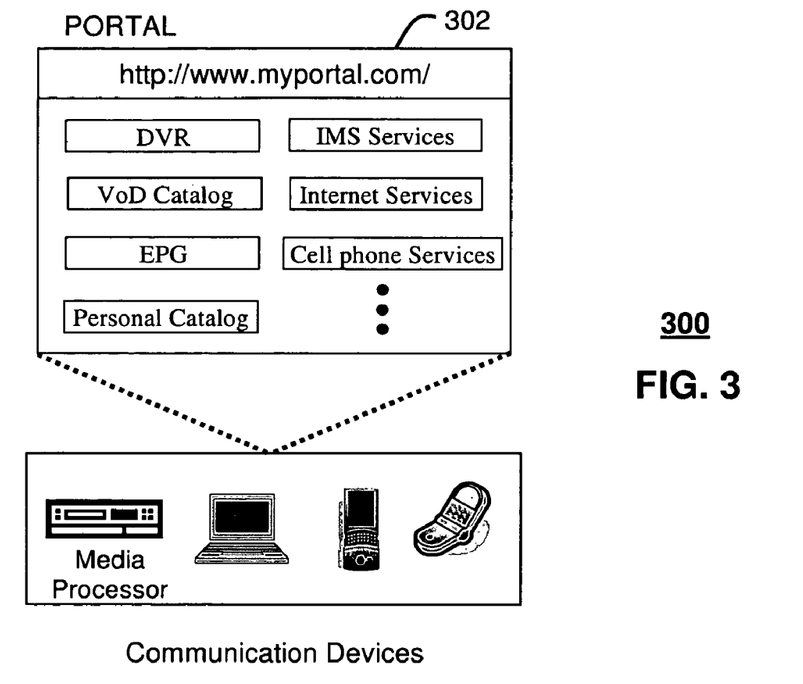
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
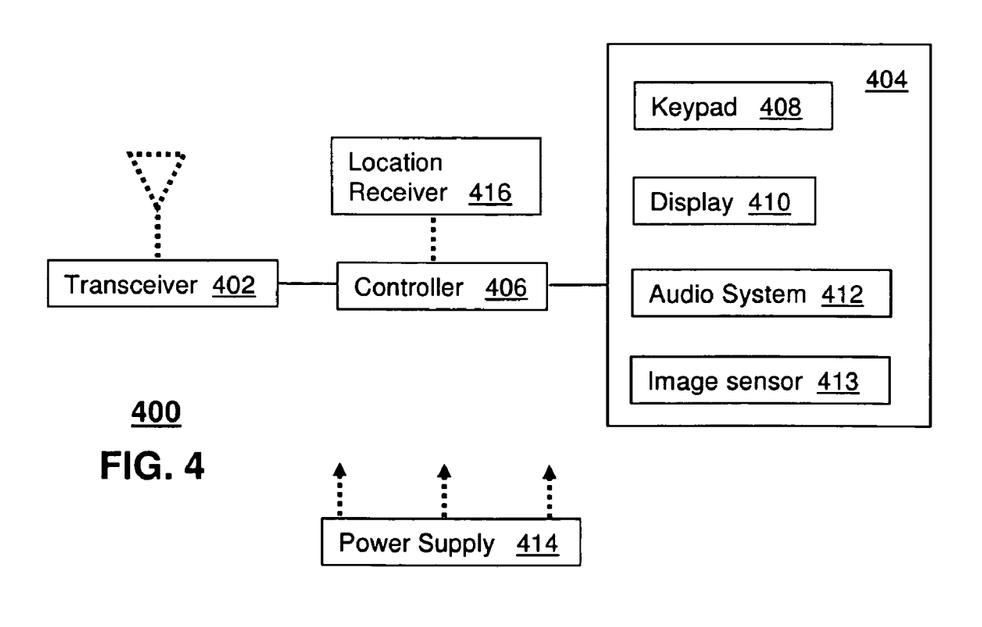
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alpha-numeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
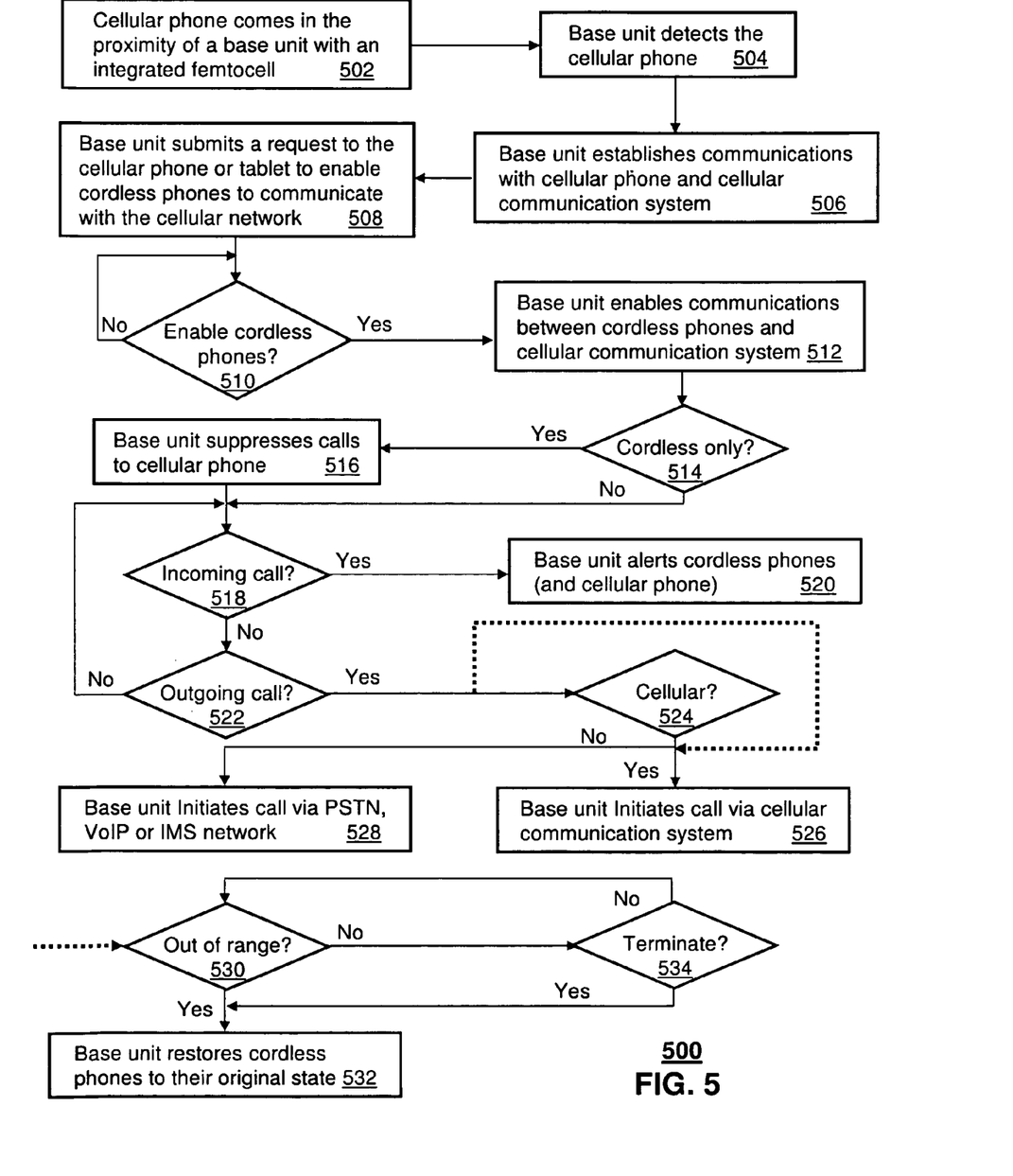
FIG. 5 depicts an illustrative embodiment of a method according to the present disclosure.
Figure 6:
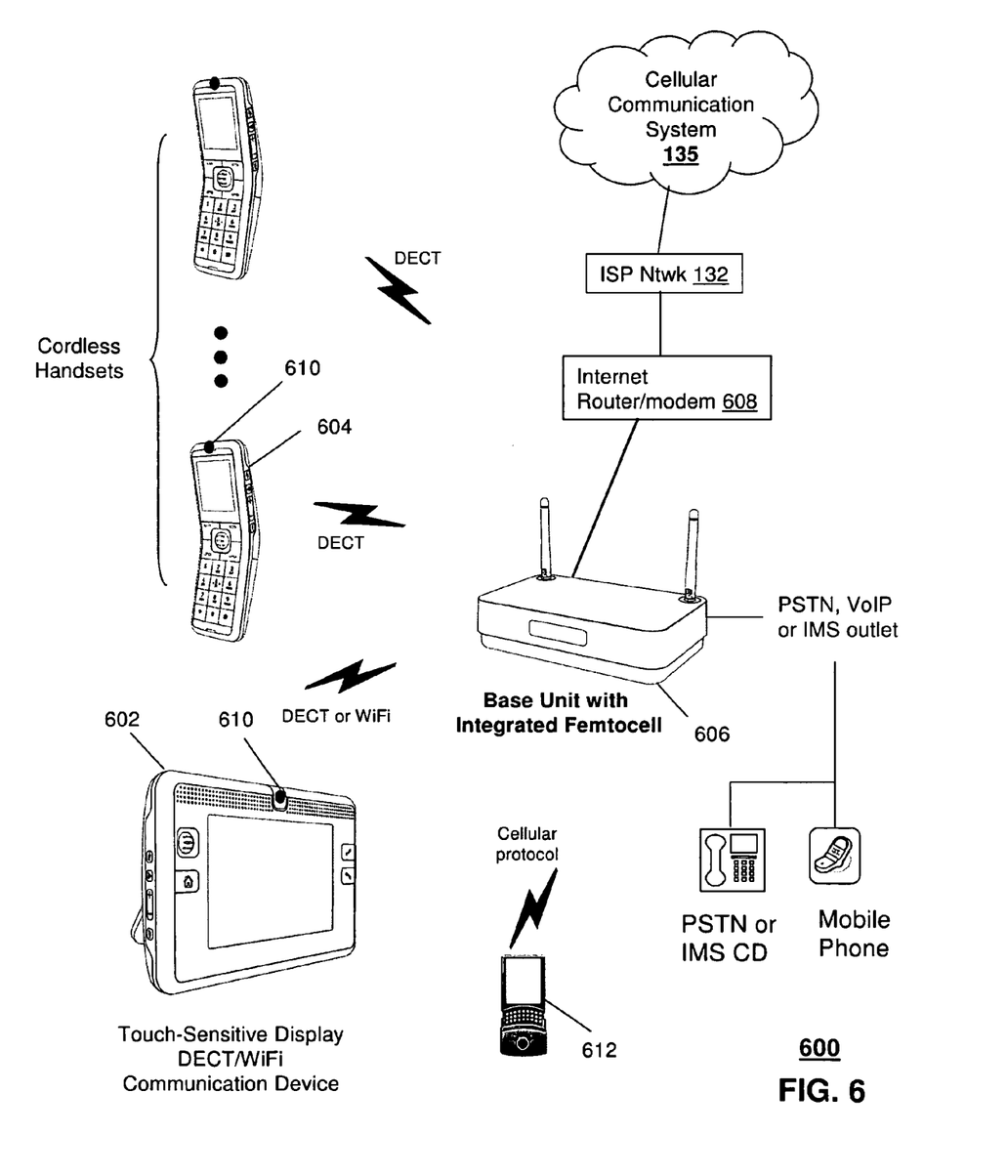
FIGS. 6-7 depict illustrative embodiments of communication devices operating according to the method of FIG. 5.

FIG. 5 depicts an illustrative a method 500 operating in portions of the aforementioned communication systems. FIG. 6 shows an illustrative embodiment of communication devices operating according to method 500. Block diagram 600 comprises a landline communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the ISP network 132 of FIG. 1. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures.

The base unit 606 can also integrate femtocell technology in the form of common hardware and software for short range cellular communications with cellular phones such as reference 612. When the cellular phone 612 is in a communication range of the femtocell transceiver integrated in the base unit 606, the base unit can provide the cellular phone cellular communication services by communicating with the cellular communication system 135 over a broadband interface of the Internet router/modem 608. The base unit 606 can also be programmed to enable the tablet 602 and/or handsets 604 to communicate with the cellular communication system 135 while the cellular phone 612 is in communications with the base unit.

Figure 7:
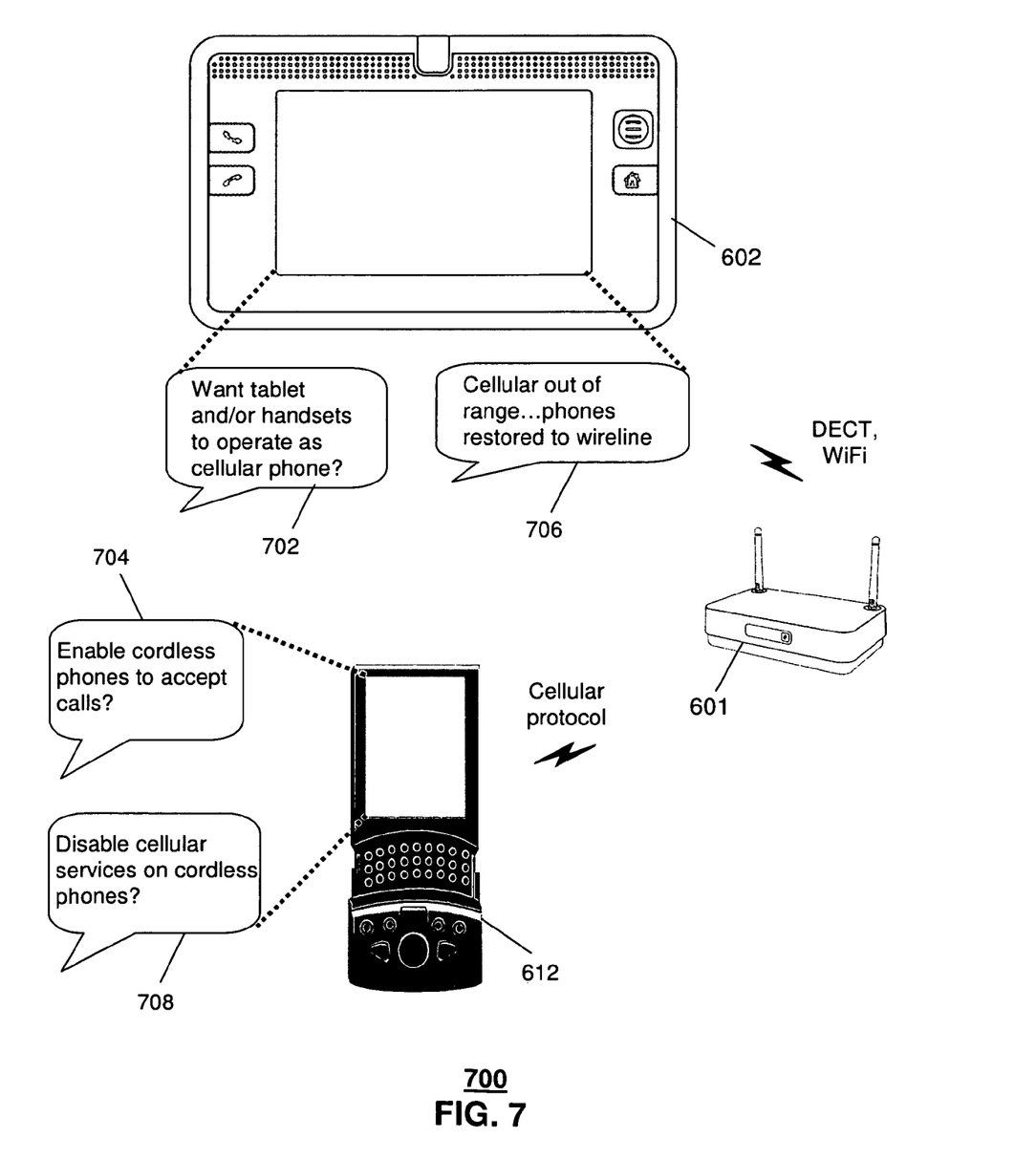

With the configuration of FIG. 6 in mind, method 500 can begin with step 502 in which the cellular phone 612 comes in the proximity of the base unit 606. In step 504, the base unit 606 detects the cellular phone 612 by way of the integrated femtocell, and in step 506 establishes communications with the cellular phone by way of the femtocell and the cellular communication system 135 by way of the broadband interface of the Internet router/modem 608. In this step, the cellular phone 612 can receive and initiate calls in the same manner as it would while roaming by way of a remote base station such as reference 117 of FIG. 1. While the cellular phone 612 is in communication with the base unit 606, the base unit can submit in step 508 a request to the cellular phone or the table 602 in the form of a query such as references 702 and 704 presented by way of a user interface of the tablet 602 and cellular phone 612 as shown in FIG. 7.

At the tablet 602 the query can ask a user whether s/he would like to enable the tablet and/or certain handsets 604 to operate as the cellular phone 612. The base unit 606 can also direct the query as shown by reference 704 to the cellular phone 612. The user can respond to this query by way of the UI functions of the cellular phone 612 (e.g., softkeys, navigation function, menus, etc.). An affirmative response to the inquiry creates a state in the base unit 602 for treating the tablet 602 and/or selected handsets 604 operationally the same as the cellular phone 612. Accordingly, when the base unit 606 detects an incoming call directed to the cellular phone 612 by way of the broadband interface, the base unit 606 can also redirect the call to the tablet 602 and/or the handsets 604. In this way, the user can answer the call on any number of communication devices communicatively coupled to the base unit 606, not just the cellular phone 612.

If the user chooses in step 510 to enable the cordless phones in this manner, the base unit 606 can proceed to step 512 where it records a state for directing incoming calls of the cellular phone 612 to the tablet 602 and cordless handsets 604. For outgoing calls, the base unit 606 can provide the tablet 602 and/or cordless handsets 604 the option to make a call by regular landline means (PSTN, VoIP, or IMS), or by the cellular communication system 135 as if the cellular phone were conducting the call. In this latter embodiment, when the tablet 602 or cordless handset 604 initiates a cellular call, the base unit 606 can emulate a cellular call using an electronic serial number (ESN) or International Mobile Equipment Identity (IMEI) of the cellular phone 612 as well as other signaling information to conduct the call as if it had originated from the cellular phone.

Once the base unit 606 has enabled the cordless phones 602, 604 in step 512, the base unit can also query the tablet 602 or the cellular phone 612 to determine whether the tablet 602 and/or cordless handsets 604 are to function as the cellular phone 612 exclusively without the cellular phone's participation. In this state when incoming calls are directed to the cellular phone 612, only the tablet 602 and/or cordless phones 604 are signaled with an audible alert that indicates an incoming call is pending. The base unit 606 would not direct the call to the cellular phone 612, and thereby would not assert an audible alert corresponding to the call.

If the user chooses by way of UI manipulations to operate cellular calls only by way of the cordless phones 602, 604, then the base unit 606 can proceed to step 516 where it suppresses calls to the cellular phone 612. Otherwise, cellular calls would be directed to the cellular phone 612 and the cordless phones 602, 604 selected in steps 508-510.

From this point, the cordless phones 602, 604 and/or the cellular phone 612 are prepared to accept incoming calls at step 518 or conduct calls at step 522. If an incoming call directed to the cellular phone 612 is detected in step 518, the base unit 606 alerts in step 520 the cordless phones 602, 604 and/or the cellular phone 612. If an outgoing call is initiated in step 522 by a cordless phone 602, 604, the base unit 606 can submit a query to the cordless phone in step 524 to determine if the call is to be placed through the cellular communication system 135.

If it is not, the base unit 606 can place the call in step 528 via the PSTN, VoIP or IMS network discussed previously. Otherwise, the call is placed in step 526 by way of the cellular communication system 135. If the call is originated by the cellular phone 612 at step 522, the base unit 606 can be programmed to skip step 524 and proceed to step 526 where it places the call on the cellular communication system 135. Alternatively, the base unit 606 can be programmed to provide the cellular phone 612 the option to place the call by way a landline connection such as the PSTN, VoIP or IMS network in step 528.

In steps 530 and 534, the base unit 606 can also be programmed to monitor actions that can cause the base unit to restore the cordless phones 602, 604 to their original state of landline-only phones. In step 530, for example, the base unit 606 can be programmed to detect an out-of-range condition with the cellular phone 612. This condition can arise when the cellular phone 612 is no longer in the communication range of the femtocell of the base unit 606 or when the cellular phone is turned off. When this condition is detected, the base unit 606 can be programmed to restore in step 532 the cordless phones 602, 604 to their original landline-only state and submit a status message such as reference 706 to the tablet 602.

If an out-of-range condition is not detected, the base unit 606 can monitor in step 534 a proactive termination request from one of the cordless phones 602, 604 or the cellular phone 612. The termination request can be a UI option provided in either the cordless phones 602, 604 and/or the cellular phone 612 such as shown by reference 708. When a proactive termination request is detected, the base unit 606 can proceed to step 532 where it restores the cordless phones 602, 604 to their original landline-only state.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that base unit transcodes signals generated by the cellular phone 612 to communicatively couple the cellular phone to the landline communication system in step 528. Accordingly, the cellular phone can also operate as one of the landline phones 602, 604 on the PSTN, VoIP or IMS network. In another embodiment, the base unit 606 in whole or in part can be an integral part of the STB 106 of FIG. 1. Accordingly, method 500 can be adapted to operate in an interactive IPTV, cable TV or satellite TV communication system. From these illustrations, it would be apparent for an artisan with ordinary skill in the art that the present disclosure can be adapted so that a cellular phone or a landline phone can operate in either a landline communication system (such as shown in FIG. 2) or a cellular communication system (such as shown in FIGS. 1 and 6). Similarly, it would be apparent to said artisan that the base unit 606 with a built-in femtocell can be integrated in other communication devices such as the Internet/router modem 608 of FIG. 6.

Other suitable modifications can be applied to the present disclosure without departing from the scope of the claims below. Accordingly, the reader is directed to the claims section for a fuller understanding of the breadth and scope of the present disclosure.

Figure 8:
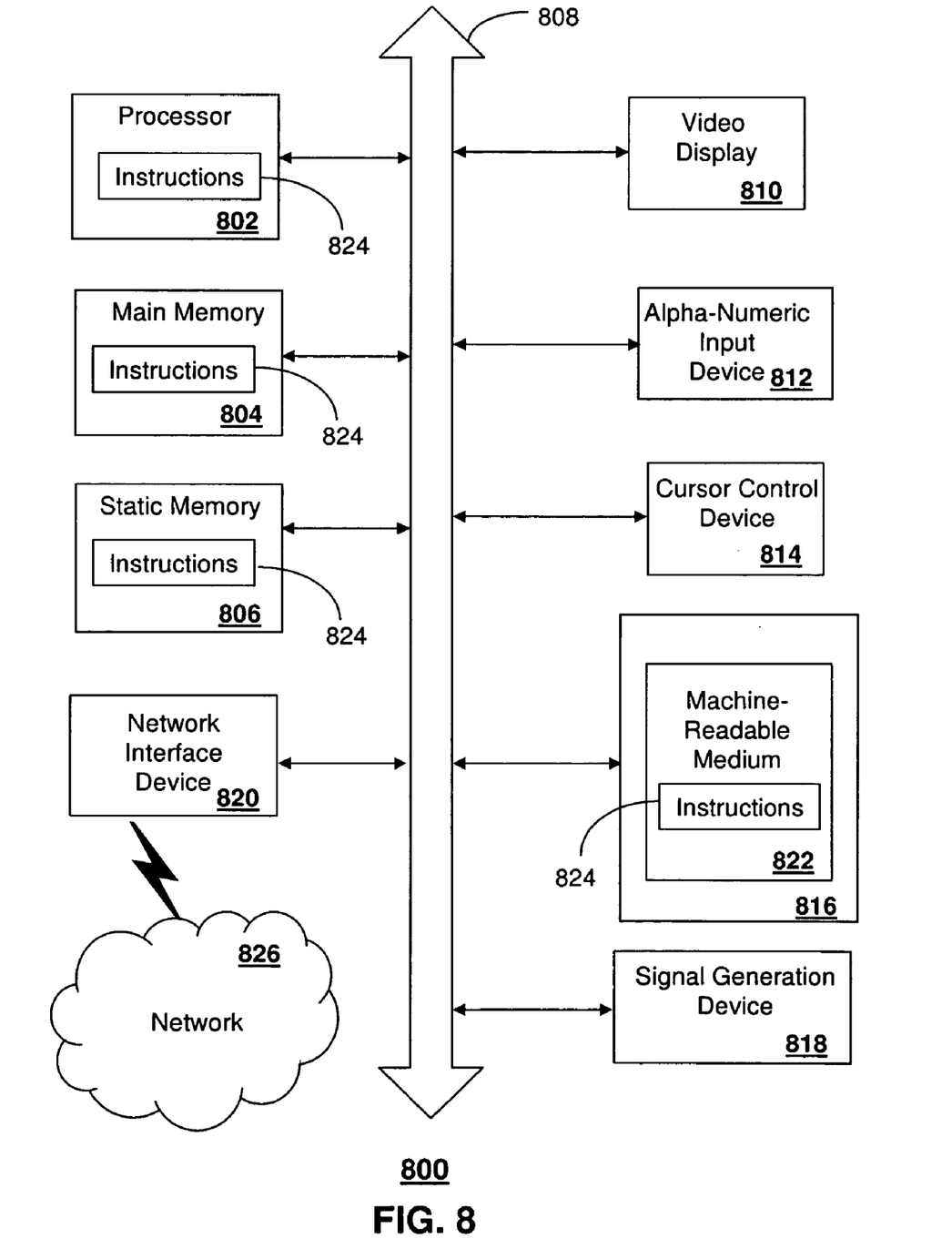
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A base unit comprising:
   a memory storing computer instructions;
   a broadband interface; and
   a controller circuit coupled to the memory and the broadband interface, wherein the controller circuit when executing the computer instructions performs operations comprising:
   detecting a cellular phone;
   facilitating establishing wireless communications with the cellular phone;
   facilitating establishing communications with a cellular communication system by way of the broadband interface; and
   enabling one or more landline phones communicatively coupleable to the controller circuit to communicate with a remote end user device via the cellular communication system utilizing identification information of the cellular phone and responsive to the establishing of the wireless communications between the controller circuit and the cellular phone, wherein the enabled communication between the one or more landline phones and the remote end user device comprises a voice call.

2. The base unit of claim 1, wherein the controller circuit when executing the computer instructions performs operations comprising:
   disabling communications to the cellular phone while the one or more landline phones are enabled to communicate with the cellular communication system; and
   enabling the one or more landline phones to communicate with the remote end user device via a second communication system utilizing identification information of the one or more landline phones when the one or more landline phones are not enabled to communicate with the remote end user device via the cellular communication system.

3. The base unit of claim 2, wherein the controller circuit when executing the computer instructions performs operations comprising:
   transmitting a query to the cellular phone to determine whether operations are to be transferred to the one or more landline phones; and
   disabling calls directed to the cellular phone responsive to receiving an affirmative response to disable the cellular phone while it is communicatively coupled to the controller circuit.

4. The base unit of claim 1, wherein the controller circuit when executing the computer instructions performs operations comprising:
   detecting an incoming call from the cellular communication system directed to the cellular phone;
   causing the one or more landline phones to present an incoming call alert responsive to detecting the incoming call; and
   preventing the cellular phone from presenting the incoming call alert.

5. The base unit of claim 1, wherein the identification information of the cellular phone comprises an electronic serial number, and wherein the controller circuit when executing the computer instructions performs operations comprising monitoring an action to disable communications between the one or more landline phones and the cellular communication system.

6. The base unit of claim 1, wherein the identification information of the cellular phone comprises an international mobile equipment identity, and wherein the controller circuit when executing the computer instructions performs operations comprising disabling communications between the one or more landline phones and the cellular communication system responsive to receiving a termination request from the cellular phone or one of the one or more landline phones.

7. The base unit of claim 1, wherein the controller circuit when executing the computer instructions performs operations comprising disabling communications between the one or more landline phones and the cellular communication system responsive to detecting that the cellular phone is outside of a communication range threshold of the base unit.

8. The base unit of claim 1, wherein the controller circuit when executing the computer instructions performs operations comprising disabling communications between the one or more landline phones and the cellular communication system responsive to receiving a request from the cellular phone.

9. The base unit of claim 1, wherein the controller circuit when executing the computer instructions performs operations comprising:
   receiving from one of the one or more landline phones or the cellular phone a request to initiate an outgoing call; and
   initiating the outgoing call by way of a landline communication system or the cellular communication system.

10. The base unit of claim 9, wherein the controller circuit when executing the computer instructions performs operations comprising receiving from the landline phone initiating the outgoing call a request to initiate the outgoing call by way of the cellular communication system.

11. The base unit of claim 9, wherein the controller circuit when executing the computer instructions performs operations comprising transcoding signals generated by the cellular phone to communicatively couple the cellular phone to the landline communication system.

12. The base unit of claim 1, wherein the one or more landline phones are communicatively coupleable to the base unit by way of a cordless phone protocol, and wherein the base unit is communicatively coupleable to the cellular communication system by way of a data communications protocol.

13. The base unit of claim 12, wherein the cordless phone protocol corresponds to a digital enhanced cordless telecommunications protocol, and wherein the data communications protocol corresponds to an internet protocol.

14. The base unit of claim 1, wherein the base unit is in communication with a public switched telephone network communication system and an internet protocol multimedia subsystem communication system.

15. The base unit of claim 1, wherein the base unit is an integral part of a set-top box that is in communication with an internet protocol television network for receiving media services, and wherein the controller circuit when executing the computer instructions performs operations comprising enabling the one or more landline phones to communicate over the broadband interface with the remote end user device via a voice over internet protocol communication system utilizing identification information of the one or more landline phones when the one or more landline phones are not enabled to communicate with the remote end user device via the cellular communication system.

16. A non-transitory computer-readable storage medium operable at least in part in a device having a premises cellular access point, the storage medium comprising computer instructions which when executed by a processor cause the processor to perform operations comprising:
   detecting a cellular phone;
   facilitating establishing communications with a cellular communication system by way of a broadband interface of the device; and
   enabling one or more landline phones to communicate with a remote end user device via the cellular communication system utilizing identification information of the cellular phone and responsive to detecting the cellular phone.

17. The non-transitory computer-readable storage medium of claim 16, comprising computer instructions which when executed by the processor cause the processor to perform operations comprising facilitating establishing wireless communications with the cellular phone.

18. The non-transitory computer-readable storage medium of claim 17, comprising computer instructions which when executed by the processor cause the processor to perform operations comprising:
   disabling communications between the one or more landline phones and the cellular communication system responsive to detecting a termination of the wireless communications with the cellular phone; and
   enabling the one or more landline phones to communicate with the remote end user device via a second communication system utilizing identification information of the one or more landline phones when the one or more landline phones are not enabled to communicate with the remote end user device via the cellular communication system.

19. A cellular phone, comprising:
   a memory storing computer instructions; and
   a controller circuit coupled to the memory, wherein the controller circuit when executing the computer instructions performs operations comprising:
   facilitating establishing communications with a cellular communication system by way of a device operating in part as a premises cellular base station to enable one or more landline phones to communicate with a remote end user device via the cellular communication system utilizing identification information of the cellular phone and responsive to the cellular phone being communicatively coupled to the device.

20. The cellular phone of claim 19, wherein the controller circuit when executing the computer instructions performs operations comprising:
   providing information to enable detection of the cellular phone by the device, wherein the the cellular phone is communicatively coupled to the device in response to the detection of the cellular phone; and transmitting a signal to the device to disable communications between the one or more landline phones and the cellular communication system.

21. The cellular phone of claim 19, wherein the premises base station corresponds to a femtocell, and wherein the controller when executing the computer instructions performs operations comprising initiating calls over voice over internet protocol communication network by way of a broadband interface of the device.

22. A landline phone, comprising:
a memory storing computer instructions; and
a controller circuit coupled to the memory, wherein the controller circuit when executing the computer instructions performs operations comprising:
receiving from a cellular communication system in-coming calls directed to a cellular phone responsive to the cellular phone facilitating establishing communications with a premises cellular base station.

23. The landline phone of claim 22, wherein the controller circuit when executing the computer instructions performs operations comprising initiating out-going calls via the cellular communication system utilizing identification information of the cellular phone responsive to the cellular phone facilitating establishing communications with the premises cellular base station, wherein the premises cellular base station corresponds to a femtocell operable from a base unit, wherein the landline phone operates from the base unit, wherein the landline phone is operable according to a cordless phone protocol corresponding to a digital enhanced cordless telecommunications protocol, and wherein the cellular communication system operates according to one of a global system for mobile protocol, a code division multiple access protocol or a universal mobile telecommunications service protocol.

24. A method, comprising:
utilizing a premises cellular base station to enable a landline phone to receive from a cellular communication system in-coming calls directed to a cellular phone responsive to the cellular phone being communicatively coupled to the premises cellular base station.

25. The method of claim 24, comprising utilizing the premises cellular base station to enable the landline phone to initiate out-going calls via the cellular communication system utilizing identification information of the cellular phone and responsive to the cellular phone being communicatively coupled to the premises cellular base station, wherein the landline phone operates according to a cordless phone protocol, and wherein the premises cellular base station corresponds to a femtocell operable according to one of a global system for mobile protocol, a code division multiple access protocol or a universal mobile telecommunications service protocol.

* * * * *